United States Patent [19]

Beghelli

[11] Patent Number: 4,945,280
[45] Date of Patent: Jul. 31, 1990

[54] INDEPENDENT EMERGENCY LIGHTING SYSTEM WITH SELF-DIAGNOSIS

[75] Inventor: Gian P. Beghelli, Monteveglio, Italy

[73] Assignee: G.P.B. Beghelli s.r.l., Bologna, Italy

[21] Appl. No.: 257,863

[22] Filed: Oct. 14, 1988

[30] Foreign Application Priority Data

Oct. 29, 1987 [IT] Italy ................................. 3675 A/87

[51] Int. Cl.$^5$ ................................................ H02J 9/00
[52] U.S. Cl. ...................................... 315/129; 315/86; 315/130; 315/131; 340/516; 340/825.17
[58] Field of Search ................. 315/86, 129, 130, 131, 315/136; 340/506, 514, 516, 825.16, 825.17, 825.36

[56] References Cited

U.S. PATENT DOCUMENTS 4,297,614  10/1981  Chandler ............................... 315/86

FOREIGN PATENT DOCUMENTS 2059196  4/1981  United Kingdom ................ 315/129

*Primary Examiner*—Eugene R. LaRoche
*Assistant Examiner*—Do Hyun Yoo
*Attorney, Agent, or Firm*—Fleit, Jacobson, Cohn, Price, Holman & Stern

[57] ABSTRACT

An emergency lighting system of an advanced type which, through the use of an appropriate microprocessor, can be used to check the recharging current and voltage of the batteries and detect faults in the circuit and the fluorescent or incandescent lamps, with the programming and performance of a functional test over a programmable period, with a visual display and the programming and performance of an independence test at programmable intervals. The results of the periodical fault tests and the independence test are communicated to a centralized control and monitoring unit which can be activated remotely and is also capable of receiving and transmitting operating orders to the individual emergency units. A microprocessor circuit for performing the periodical functional test on the connected lamps, and for programming and performance of the independence test at programmable intervals, providing an indication of defective lamps and deactivating one or more lamps, is included in the battery unit.

5 Claims, 3 Drawing Sheets

INDEPENDENT EMERGENCY LIGHTING SYSTEM WITH SELF-DIAGNOSIS

FIELD OF THE INVENTION

This invention relates to an independent emergency lighting system of an advanced type, characterized by a set of circuits equipped with a microprocessor and capable of performing plurality of functions including complete operational self-diagnosis, with the display of information for the centralisation of information and the centralisation of supply.

BACKGROUND OF THE INVENTION

The fact that independent devices of various fixed and/or portable types are used for emergency lighting is currently known. A requirement for the existence of independent emergency lighting is made by the legal regulations applying to places of work, storage of hazardous materials, units for the production and transforming of electrical power, underground or enclosed car parks, premises used for accommodation and public spectacles or meetings, schools, hospitals, etc. some devices can be located in rooms separate from those in which the lamps are mounted, others are installed in an appropriate position close to the ceiling lights whose operation they are designed to ensure. Others again may be placed within the ceiling lights themselves and provide protection against interruptions in the main power supply. All devices have the common feature that their emergency operation is activated as soon as there is a lack of main power, whether they are mounted with lamps for continuous lighting or with lamps for non-continuous and only emergency lighting. Under emergency conditions electrical power is provided by appropriate batteries, which in general are rechargeable.

The problems of knowing the state of charge of the batteries and the reliability of the circuits at all times and of estimating the effectiveness of such equipment when needed have not been solved in the prior art. Periodical inspection to check condition involves operations which are not always easy and are selective and in any event burdensome to the user who very often has to check the operation of a number of separate independent units at different locations within a variety of environments.

OBJECT OF THE INVENTION

An object of this invention is to provide an emergency lighting system of an advanced type which through the use of an appropriate microprocessor can be used to check the recharging current and voltage of the batteries and detect faults in the circuit and the fluorescent or incandescent lamps, with the programming and performance of a functional test over a programmable period, with a visual display and the programming and performance of an independence test at programmable intervals. Another object is that the results of the periodical fault tests and the independence test are communicated to a centralised control and monitoring unit which can be activated remotely and is also capable of receiving and transmitting operating orders to the individual emergency units.

A further object is that a microprocessor circuit for performing the periodical functional test on the connected lamps, and for programming and performance of the independence test at programmable intervals, providing an indication of defective lamps and deactivating one or more lamps, is included in the battery unit.

SUMMARY OF THE INVENTION

These and other objects which will become more apparent below are all achieved by the system according to the invention comprising an intelligent independent emergency lighting system having the special features of self-diagnosis, display programming, the centralisation of controls and supply, and remote activation. The microprocessor circuit having the programming control function emits and receives signals which following appropriate amplification, reach the various components of the system. These signals are produced by electronic impulses which, as a result of their strength, polarity, wave shape and amplitude, etc., initiate or inhibit the operation of internal microcircuits opening "passages" and "running through" the desired routes in a predetermined order. The output and input signals control timed and sequential operations which are mainly associated with system functions, and are controlled by appropriate programming of the microprocessor.

BRIEF DESCRIPTION OF THE DRAWINGS

An example of this invention will now be described with reference to the accompanying drawings in which.

SPECIFIC DESCRIPTION

Figure 1:
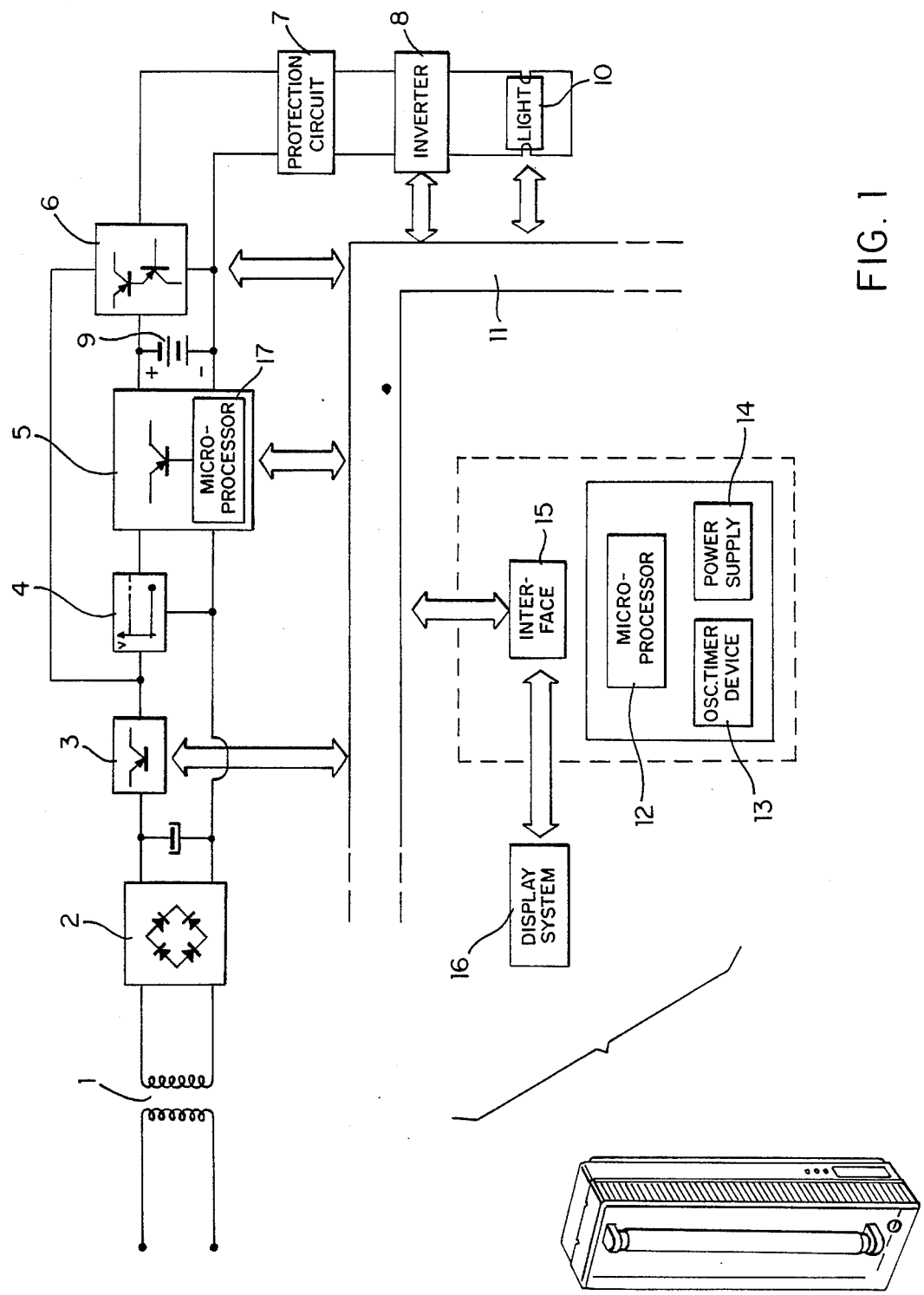
FIG. 1 illustrates diagrammatically the components of the independent emergency lighting system equipped with self-diagnosis, programming, and a lamp-related display.

Starting with transformer 1 and rectifier 2 unit the system transforms the alternating main voltage into a steady voltage of an appropriate value.

A controlled electronic switch 3 performs the function of switching on and switching off the circuit when commanded, and the action of voltage regulator 4 stabilises the steady voltage at a predetermined value.

The ability of the system to act on signals to the electronic switch, consisting of a series transistor, makes it possible to activate or deactivate the entire emergency device.

Battery recharging control unit 5 with microprocessor control 17 determines the charging voltage and current of battery 9 at all times.

Through control of the voltage and current in relation to the battery's state of charge maximum, use can be made of the battery's capacity and its life can be extended.

The instantaneous voltage and current values are fixed by the microprocessor on the basis of the stored program. Unit 6 is the circuit providing the emergency supply from battery 9 to fluorescent tube lamp 10, following insertion of inverter 8 to change from direct current to high frequency alternating current for fluorescent tube 10.

Minimum circuit 7 is also included in the unit protect battery 9 when the voltage falls below the safe minimum. 11 indicates the data bus for the exchange of information between the circuit blocks of the system and the microprocessor. Microprocessor 12 which acts as a control programmer is involved in the flow of data along the bus.

In particular the microprocessor sequentially interrogates the various circuit blocks, compares the responses received with stored data and implements the appropriate operating strategies on the basis of the results of these comparisons. Said microprocessor 12 acts within a circuit which incorporates an interface 15 for the exchange of input and output data, with an oscillator timing device 13 which provides the working frequency for the microprocessor and a stabilised supply system 14 with integrated circuits.

Figure 2:
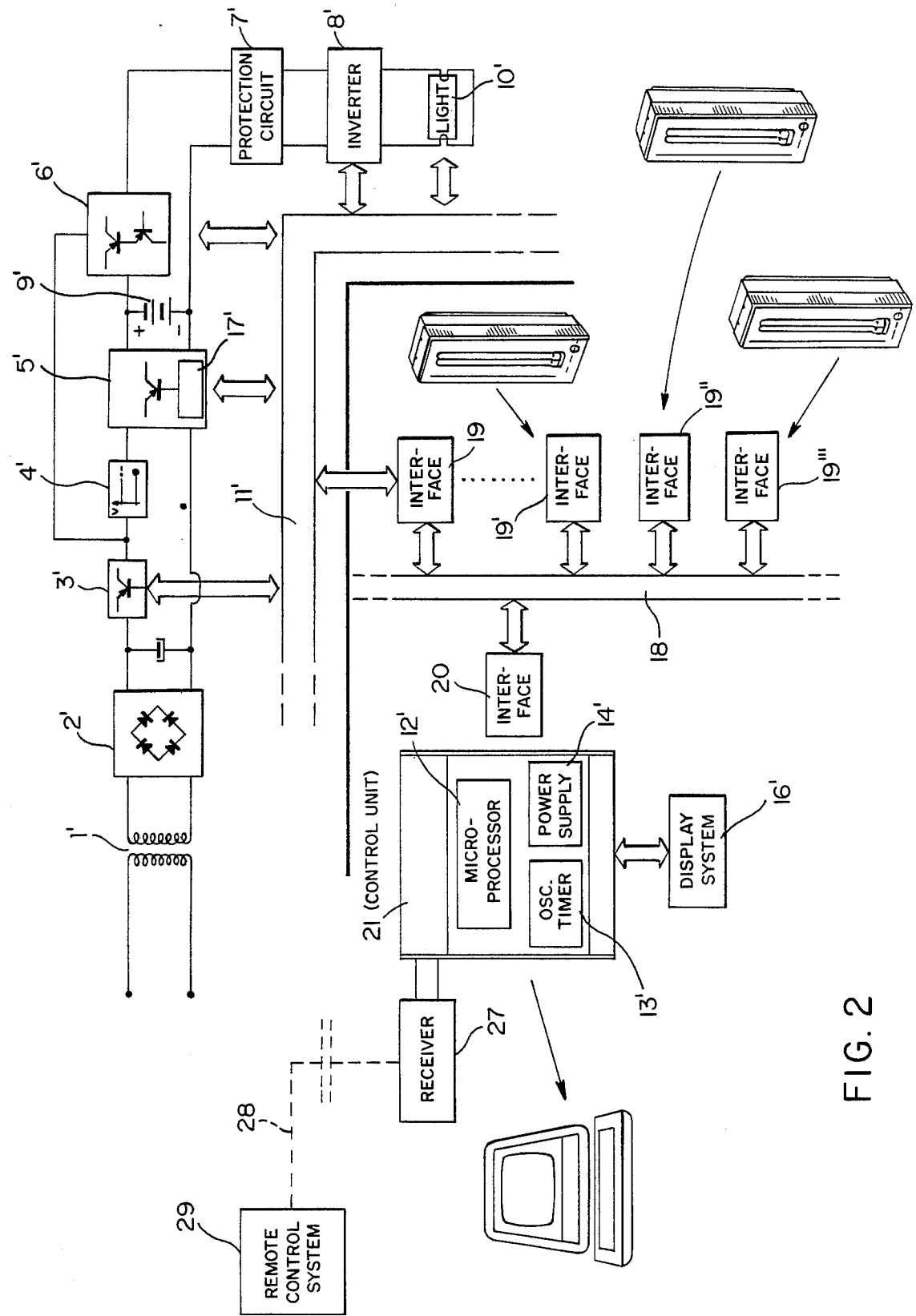
FIG. 2 illustrates diagrammatically the components of the system involving the centralised control of one or more lamps.

Inputs to the microprocessor also provide for a reset signal which appropriately restarts the program when an interruption or major variation in the supply voltage occurs. From interface 15 a display system 16 of the LED diode or LCD liquid crystal type communicates required information outside the system. In FIG. 2 the emergency lighting points or lamps are connected to common bus 18 through their corresponding interfaces, 19, 19', 19'', 19'''.

Figure 3:
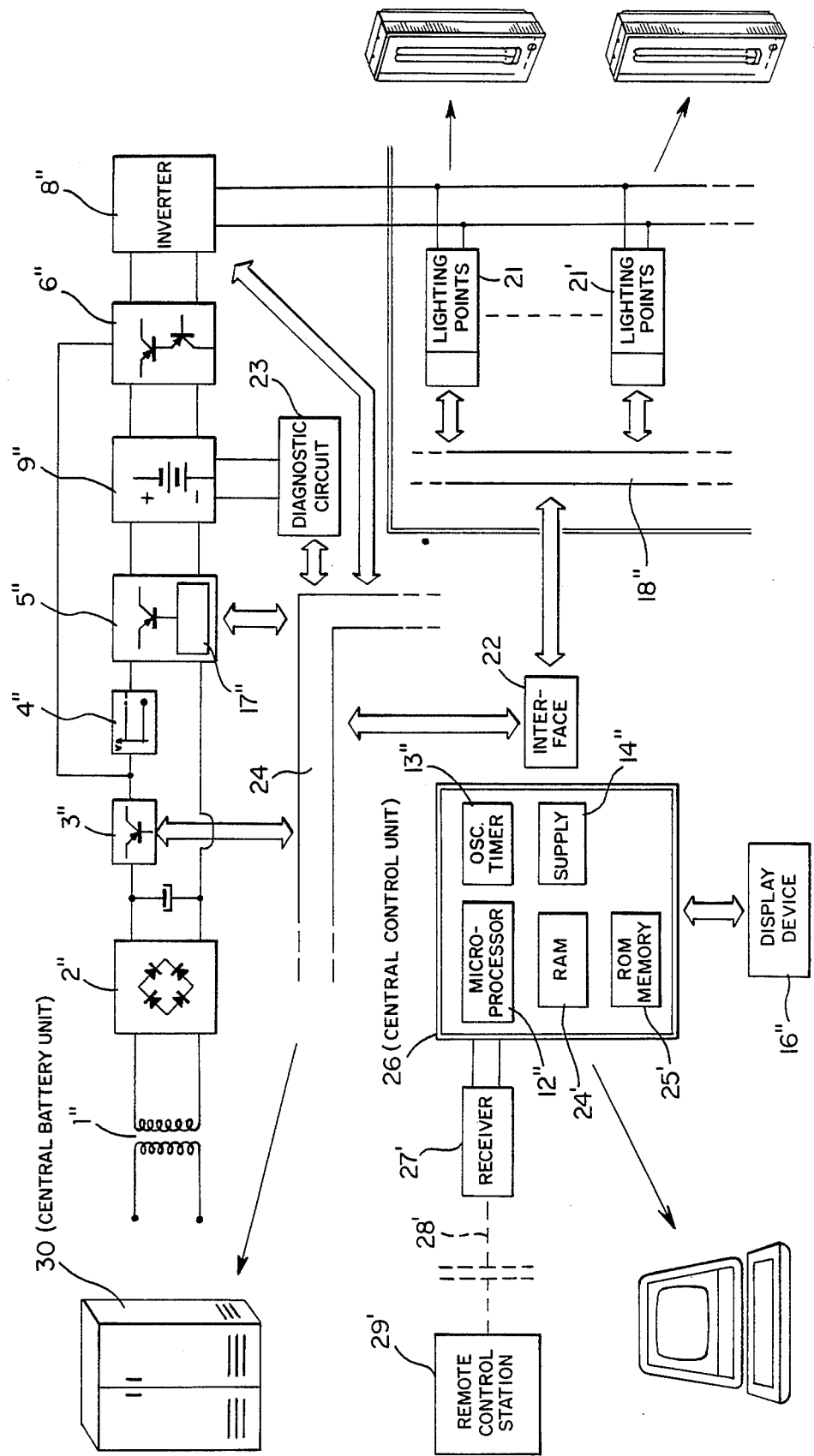
FIG. 3 shows the components of the system associated with the central battery unit with recharging, diagnosis and centralised programmable testing therefor.

These interfaces consist of analog/digital converters which transform circuit status information into coded digital pulses (bits) which can be read by the microprocessor. The interface is obviously capable of performing the reverse function, i.e. of appropriate actuators. From common bus 18 a data exchange interface 20 provides a connection to the central control unit 21 which consists essentially of microprocessor 12', timer 13' and supply 14', which in turn outputs to a display system 16'. Central control unit 21 may be activated by means of a telephone receiver of the modem type or a radio receiver 27 connected to it, which in turn receives operating instructions via a telephone or radio link 28 from a remote control system 29 which likewise operates using a telephone modem or the like or a radio transmitter. In FIG. 3 the intelligent system connects all the lighting points 21, 21' or the battery diagnosis circuit 23 to interface 22 of the new centralised control 26 via common bus 18' and the new data bus 24.

Central control unit 26, which is equipped with microprocessor 12'', incorporates a RAM memory 24', a ROM memory 25, a timer circuit 13'' and a microprocessor supply 14''. The status parameters for various operating conditions of the system and the individual circuit blocks are stored in the ROM memory. These parameters relate either to optimum operating conditions or various fault situations. These are stored when the circuit is constructed, on the basis of historical operating data tested in the laboratory and determined in practical application.

The microprocessor controls the various circuit blocks in a cycle, stores the data received into the RAM memory, compares them with those stored in the ROM and puts an appropriate strategy, e.g. deactivation of lighting points, outputting of an alarm signal, etc. into effect if it discovers a fault.

In FIG. 3, as in the situation illustrated in FIG. 2, a connection to display device 16'' and a connection to a receiver 27' connected at 28' to a remote control station 29' leave unit 26. The central battery unit and its associated circuits are enclosed within electrical equipment cabinet 30. In addition to recharging the battery these circuits effect a diagnosis of the batteries by analysing their voltage response to specific current pulses.

This invention fulfils the objects specified and, in particular, appreciably increases the safety and reliability of present emergency lighting equipment, while at the same time substantially reducing the burden of testing and preventive maintenance.

This invention, which is illustrated in a diagrammatical and simplified manner should be understood to be capable of extension to all those additional variants which fall within the scope of the following claims.

I claim:

1. An independent emergency lighting system with self-diagnosis having individual lighting devices, comprising:
   means for controlling timed sequences and sequences affecting the control functions;
   means for programming tests and diagnosis of the lighting system, via appropriate interfaces;
   means for communicating results of periodical fault tests and independence tests to a centralized control and monitoring unit which is able to issue commands to activate/deactivate lighting equipment;
   means for supplying the individual lighting devices by a centralised battery unit equipped with a programmable recharging circuit, a circuit for determining the charging condition and detection of the occurrence of incipient fault conditions; and
   means for connecting said controlling means, programming means, communicating means and supplying means together.

2. The system defined in claim 1 wherein said programming means includes a microprocessor circuit for programming and functionally testing the equipment in a programmable time sequence and for programming and performing independence tests at programmable intervals, of detecting defective equipment and of deactivating one or more lighting units.

3. The system defined in claim 1, further comprises means for activating remotely the system by means of operating instructions received via radio or via a telephone connection.

4. An independent emergency lighting system with self-diagnosis, comprising the steps of:
   controlling timed sequences and sequences affecting the control functions;
   programming tests and diagnosis of the lighting system, via appropriate interfaces;
   communicating the results of periodical fault tests and independence tests to a centralized control and monitoring unit which is able to issue commands to activate/deactivate lighting equipment;
   supplying the individual lighting devices by a centralized battery unit equipped with a programmable recharging circuit, a circuit for the determination of the charging condition and detection of the occurrence of incipient fault conditions.

5. The system defined in claim 4, further comprising the step of remotely activating the system by means of operating instructions received via radio or via a telephone connection.

* * * * *